US012605733B2

(12) United States Patent
Ay et al.

(10) Patent No.: US 12,605,733 B2
(45) Date of Patent: Apr. 21, 2026

(54) NOZZLE FOR APPLYING AN ADHESIVE MATERIAL, APPLICATION DEVICE FOR APPLYING AN ADHESIVE MATERIAL, METHOD FOR APPLYING AN ADHESIVE MATERIAL, AND COMPONENT FOR A VEHICLE

(71) Applicant: Bayerische Motoren Werke Aktiengesellschaft, Munich (DE)

(72) Inventors: Oezkan Ay, Munich (DE); Klaus Daiker, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 18/549,691

(22) PCT Filed: Feb. 7, 2022

(86) PCT No.: PCT/EP2022/052828
§ 371 (c)(1),
(2) Date: Sep. 8, 2023

(87) PCT Pub. No.: WO2022/189078
PCT Pub. Date: Sep. 15, 2022

(65) Prior Publication Data

US 2024/0157392 A1 May 16, 2024

(30) Foreign Application Priority Data

Mar. 9, 2021 (DE) ..................... 10 2021 105 583.0

(51) Int. Cl.
*B05C 5/02* (2006.01)
*B05C 11/10* (2006.01)

(52) U.S. Cl.
CPC .......... *B05C 5/027* (2013.01); *B05C 11/1018* (2013.01)

(58) Field of Classification Search
CPC .... B05C 5/027; B05C 11/1018; B05C 5/0216
See application file for complete search history.

(56) References Cited

U.S. PATENT DOCUMENTS 5,890,656 A * 4/1999 Fuhlbrigge .......... B25J 15/0019 901/29
6,206,963 B1 3/2001 Abrahams
(Continued)

FOREIGN PATENT DOCUMENTS

CH 711 623 A2 4/2017
CN 1773351 A 5/2006
(Continued)

OTHER PUBLICATIONS

PCT/EP2022/052828, International Search Report dated May 19, 2022 (Two (2) pages).
(Continued)

*Primary Examiner* — Donnell A Long
(74) *Attorney, Agent, or Firm* — Crowell & Moring LLP

(57) ABSTRACT

A nozzle for applying a bead of material onto a component or a substrate. A nozzle body has a wall that defines a nozzle duct between a first end and a second end. A first nozzle discharge opening is formed at the second end and connected to the nozzle duct. A second nozzle discharge opening is connected to the nozzle duct and is introduced into the wall at the second end.

10 Claims, 2 Drawing Sheets

(56) References Cited

U.S. PATENT DOCUMENTS

| | | | | |
|---|---|---|---|---|
| 10,758,932 | B2 | 9/2020 | Schnur et al. | |
| 2005/0269375 | A1 | 12/2005 | Ahn et al. | |
| 2008/0210894 | A1 | 9/2008 | Ahn et al. | |
| 2016/0052012 | A1 | 2/2016 | Mohr | |
| 2017/0259290 | A1 | 9/2017 | Kraft et al. | |
| 2019/0160484 | A1 | 5/2019 | Schnur et al. | |
| 2020/0009602 | A1* | 1/2020 | Taniike | B05D 7/24 |

FOREIGN PATENT DOCUMENTS

| | | | |
|---|---|---|---|
| CN | 204247472 | U | 4/2015 |
| CN | 104755182 | A | 7/2015 |
| CN | 110673400 | A | 1/2020 |
| DE | 199 38 328 | A1 | 2/2001 |
| DE | 10 2004 041 479 | A1 | 3/2006 |
| DE | 20 2007 019 244 | U1 | 10/2011 |
| DE | 10 2012 110 818 | A1 | 5/2014 |
| EP | 0 757 232 | A2 | 2/1997 |
| FR | 2 907 350 | A1 | 4/2008 |
| JP | 2007-144249 | A | 6/2007 |
| WO | WO 2008/028970 | A1 | 3/2008 |
| WO | WO 2019/191052 | A1 | 10/2019 |
| WO | WO 2020/188068 | A1 | 9/2020 |

OTHER PUBLICATIONS

German-language German Office Action issued in German application No. 10 2021 105 583.0 dated Nov. 4, 2021 (Eleven (11) pages).

English translation of Chinese-language Office Action issued in Chinese Application No. 202280009280.5 dated Sep. 13, 2025 (8 pages).

German-language Office Action issued in German Application No. 10 2021 105 583.0 dated Dec. 18, 2025 (8 pages).

* cited by examiner

NOZZLE FOR APPLYING AN ADHESIVE MATERIAL, APPLICATION DEVICE FOR APPLYING AN ADHESIVE MATERIAL, METHOD FOR APPLYING AN ADHESIVE MATERIAL, AND COMPONENT FOR A VEHICLE

This application is a 371 of International Application No. PCT/EP2022/052828, filed Feb. 7, 2022 which claims priority under 35 U.S.C. § 119 from German Patent Application No. 10 2021 105 583.0, filed Mar. 9, 2021, the entire disclosure of which is herein expressly incorporated by reference.

BACKGROUND AND SUMMARY OF THE INVENTION

The invention relates to a nozzle for applying an adhesive material onto a component or a substrate, exhibiting a nozzle body with a wall which defines a nozzle duct between a first end and a second end, wherein a first nozzle discharge opening which is connected to the nozzle duct has been formed at the second end. The invention further relates to an application device for applying an adhesive material with a nozzle of such a type, to a method for applying an adhesive material, and to a component for a vehicle.

In vehicle construction, components or workpieces are increasingly being adhesion-bonded together. For this purpose, an adhesive material in the form of a bead of material is applied onto one of the components or onto both components, and the two components are subsequently bonded together by adhesive closure under pressure. In addition, adhesive materials are employed in vehicle construction in order to seal components and therefore to protect against environmental influences such as water and dirt, for instance, and in this way to ensure their correct functionality.

The application of an adhesive material onto a component is customarily undertaken by means of a nozzle. Depending upon the desired discharge of material on the component, recourse may be had to various nozzles. In the case where use is made of a so-called round nozzle, a blob-like application of material is made possible, whereas flowing transitions are made possible in the case where use is made of a so-called hook nozzle. In addition to this, regions that are difficult to access can be reached by means of a hook nozzle.

Automatic methods are known for targeted application of an adhesive material onto a component by means of a nozzle. In the case of a so-called HRC robot (human/robot collaboration)—that is to say, human and robot share a working space without any separating protective device—the nozzle has been connected to the robot, with an operator guiding the robot—or rather the nozzle—to the place to be provided with adhesive material. By means of sensors, the robot ascertains mechanically the back pressure that is needed for applying the bead of material, and adjusts this pressure accordingly. However, reproducibility of the back pressure is only possible to a limited extent with an HRC robot.

Another automatic method is the use of a numerically controlled positioning system, which may also be designated as an NC axis system, in combination with a gear pump. In this case, the nozzle has been connected to the NC axis system which moves the nozzle in translation. The gear pump has two gears, one of these gears being driven, and adhesive material is conveyed uniformly into the nozzle in this way. In the case where use is made of a round nozzle with the NC axis system, however, flow fronts are formed and, in addition, regions that are difficult to access cannot be reached. In the case where use is made of a hook nozzle with the NC axis system, however, a back pressure that is required for sealing an application surface cannot be applied.

Another automatic device for applying a bead of material is known from WO 2020/188068 A1. This device includes a flexible nozzle body, which defines a volume through which a material for the bead of material can flow, the volume having been at least partially defined by a wall constituted by the nozzle body, and a feed opening for feeding the material into the volume through which the stream can flow. The nozzle body defines an opening region through which the material can emerge from the volume. In addition to this, the device includes an actuating system which is arranged on the nozzle body and serves to change the cross-section of the opening region by deformation of the nozzle body. The wall constitutes a barrier between the flow-through volume and the actuating system.

Furthermore, a device for applying—in particular, spraying—adhesive onto a substrate or component can be gathered from WO 2019/191052. The device exhibits a dispensing nozzle, for discharging the adhesive, and a sensor device for ascertaining a profile of a region of the surface that has been assigned, in particular, to the dispensing nozzle.

The object underlying the present invention is to create a nozzle, an application device, a method for applying an adhesive material, and a component for a vehicle that enable an improved application of an adhesive material and also an application of an adhesive material with and without back pressure.

For the purpose of achieving the object, a nozzle with the features of claim 1, an application device with the features of claim 5, a method for applying an adhesive material, with the features of claim 8, and a component for a vehicle, with the features of claim 10 are proposed.

Advantageous configurations of the nozzle, of the application device and of the method are subjects of the respective dependent claims.

A nozzle for applying an adhesive material onto a component or a substrate exhibits a nozzle body with a wall which defines a nozzle duct between a first end and a second end, wherein a first nozzle discharge opening, which is connected to the nozzle duct, has been formed at the second end, and at least one second nozzle discharge opening, which is connected to the nozzle duct, has been introduced into the wall at the second end.

By virtue of the provision of two nozzle discharge openings at the second end of the nozzle body, a multifunctional application of adhesive material is made possible. In this way, adhesive material can be applied onto a component or a substrate either without back pressure via the first nozzle discharge opening and/or with back pressure via the second nozzle discharge opening. In the case of easily accessible application surfaces, the application of the adhesive material is undertaken without back pressure, by the adhesive material being applied onto the component perpendicularly in relation to the application surface via the first nozzle discharge opening. For this purpose, the nozzle is positioned in relation to the component surface or substrate surface in such a manner that a back pressure does not arise between the second end of the nozzle and the component when the material emerges, so that the adhesive material emerges from the first nozzle discharge opening. In the case of application surfaces that are difficult to access—for instance, when the adhesive material is being pushed through under a wire, or in regions to be sealed—the application of the adhesive material is undertaken with back pressure, by the adhesive material being applied onto the component or the substrate parallel to the application surface. For this purpose, the nozzle is positioned so close to the component surface or substrate surface that a back pressure arises between the second end of the nozzle and the component, so that the adhesive material emerges laterally from the second nozzle exit opening. As a result, the nozzle has a high degree of flexibility with regard to the manner of application.

In the sense of the present application, regions that are difficult to access are understood to be subspaces or interspaces, such as, for instance, when the material is being pushed through under a wire. In the sense of the present application, easily accessible regions are understood to be application surfaces that are to be sealed from above and are easily accessible.

The first nozzle discharge opening may be perpendicular to a longitudinal axis of the nozzle body. The second nozzle discharge opening may be parallel to the longitudinal axis of the nozzle body. As a result, the adhesive material emerges from the nozzle laterally from the second nozzle discharge opening.

In the present case, the wall may also be designated as a partition, border or jacket.

The material is transported from the first end to the second end via the nozzle duct. The first end may exhibit a nozzle inlet opening which is connected to a conveying device for conveying the material into the nozzle duct. The conveying device may be a pump or gear pump.

In an advantageous configuration, the nozzle may be made of metal—in particular, aluminum—or of synthetic material.

In an advantageous configuration, the two nozzle discharge openings are introduced into the second end of the nozzle by means of a machining process such as turning or milling, for instance. In addition to this, the nozzle discharge openings may also be introduced into the second end of the nozzle body during the manufacture of the nozzle, for instance during casting or injection molding.

In an advantageous configuration, the first nozzle discharge opening and the second nozzle discharge opening have been connected to one another. Since the two nozzle discharge openings are connected to one another, a simple and inexpensive production of the nozzle discharge openings is possible. In addition, this configuration makes it possible for the adhesive material to emerge laterally via the second nozzle discharge opening in the event of a back pressure arising between the second end of the nozzle and the component. In the present case, "connected to one another" is understood to mean that the two nozzle discharge openings merge into one another, and no ridge or such like is present that separates the two discharge openings from one another. Alternatively, the two nozzle discharge openings may have been separated from one another. For instance, the two nozzle discharge openings may have been separated from one another by a ridge.

In an advantageous configuration, the first nozzle discharge opening and/or the second nozzle discharge opening is/are semicircular, polygonal or semi-elliptical. The contour of the bead of material is defined by the contour of the two nozzle discharge openings.

In an advantageous configuration, the nozzle body exhibits a first cylindrical portion, a second cylindrical portion and a conical transitional portion connecting the aforementioned two portions to one another, a diameter of the first cylindrical portion being larger than a diameter of the second cylindrical portion. The two nozzle exit openings are advantageously arranged at the free end of the second cylindrical portion. The second cylindrical portion advantageously has a length that is different to that of the first cylindrical portion. Since the second cylindrical portion has a smaller diameter and a longer length than the first cylindrical portion, the nozzle is suitable for regions that are difficult to access.

According to a further aspect, an application device is proposed for applying an adhesive material onto a component or a substrate. The application device exhibits a nozzle, a positioning system which moves the nozzle in translation, a gear pump which conveys the adhesive material to be applied into the nozzle duct of the nozzle, and a height-measuring system for measuring a spacing between the second end of the nozzle and a surface of the component or of the substrate.

The application device enables the application of an adhesive material—for instance, in the form of a bead of material—onto a component or substrate both perpendicularly in relation to an application surface and parallel to the application surface. The device is applicable in the case of easily accessible regions of the component or substrate and also in the case of regions of the component or substrate that are difficult to access. If the adhesive material is to be applied perpendicularly in relation to the application surface, as in the case of a round nozzle, a spacing between the second end of the nozzle and the surface to be applied is measured by the height-measuring system. The nozzle is subsequently brought into a position having the necessary distance from the surface, so that a discharge of material through the first nozzle discharge opening of the nozzle occurs without back pressure. This mode may be used, for instance, for components that are to be sealed from above and are easily accessible. If the adhesive material is to be applied parallel to the application surface, a spacing between the second end of the nozzle and the surface to be applied is likewise firstly measured by the height-measuring system. With the aid of the positioning system, the nozzle is subsequently positioned sufficiently close to the surface, or application surface, that a back pressure that results in a discharge of material through the second nozzle discharge opening arises between the second end of the nozzle and the surface of the component when the material emerges. This mode may be used for regions that are difficult to access, such as, for instance, when the adhesive material is being pushed through under a wire. The height-measuring system enables an accurately-fitting deployment even in the case of components that are subject to tolerances.

In an advantageous configuration, the nozzle has been mounted in rotatory manner on the positioning system. Since the nozzle is rotatable, an application of material is possible in all directions via the second nozzle discharge opening.

In an advantageous configuration, the height-measuring system is a laser measuring system or a tactile height-measuring system.

According to a further aspect, a method is proposed for applying a bead of material onto a component. In the course of the method, an accessibility of an application surface of the component is firstly ascertained. A spacing between the second end of the nozzle and the application surface is subsequently measured.

Finally, if difficult accessibility is ascertained, the second end of the nozzle is positioned at a spacing from the application surface such that a back pressure arises when the adhesive material is being applied onto the application surface, so that the adhesive material emerges from the second nozzle discharge opening, or, if easy accessibility is ascertained, the second end of the nozzle is positioned at a spacing from the application surface such that a back pressure does not arise when the adhesive material is being applied onto the application surface, so that the adhesive material emerges from the first nozzle discharge opening.

In the case of the method, recourse may consequently be had to two different modes for the application of a bead of material. Accordingly, the adhesive material can be applied either with back pressure, for instance in the case of application surfaces that are difficult to access or in the case of application surfaces that are to be sealed, or without back pressure, for instance in the case of easily accessible application surfaces.

The ascertainment of the accessibility can advantageously be undertaken by an operator or by means of a sensor.

In an advantageous configuration, the method is carried out with an application device. For this purpose, the application device may exhibit a height-measuring system, by means of which a spacing between the first end of the nozzle and the application surface is measured prior to the positioning of the nozzle. Furthermore, the application device may exhibit a positioning system which moves the nozzle in translation and positions it at a spacing from the application surface.

According to a further aspect, a component for a vehicle is proposed that exhibits an adhesive material applied by means of a nozzle, by means of an application device or by means of a method.

A nozzle, an application device, a component for a vehicle, a method for applying a bead of material, as well as further advantages and features, will be elucidated in more detail in the following by reference to the Figures.

DETAILED DESCRIPTION OF THE DRAWINGS

Figure 1:
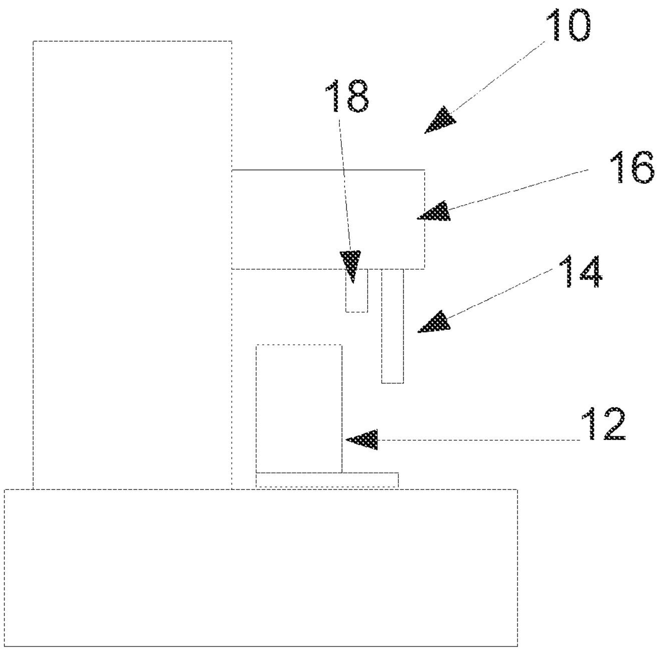
FIG. 1 shows an application device with a nozzle and with a component.

In FIG. 1 an application device 10 is shown which serves for applying an adhesive material—such as an adhesive, for instance—in the form of a bead of material onto a component 12 of a vehicle or onto a substrate.

The application device 10 exhibits a nozzle 14, a positioning system 16 which moves the nozzle 14 in translation, a gear pump, not represented, and a height-measuring system 18 for measuring a spacing between the nozzle 14 and an application surface of the component 12 or of the substrate.

Figure 2:
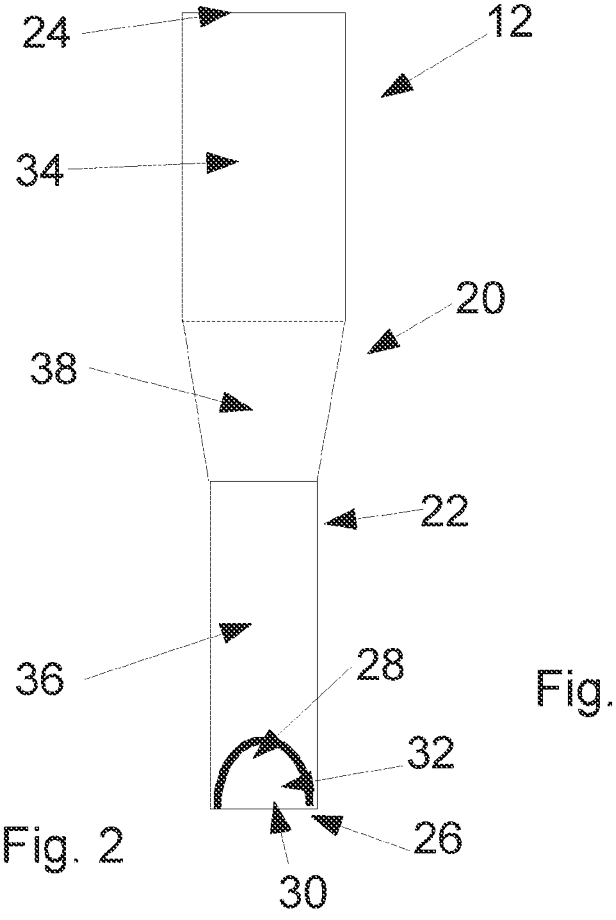
FIG. 2 shows an enlarged side view of the nozzle.
Figure 3:
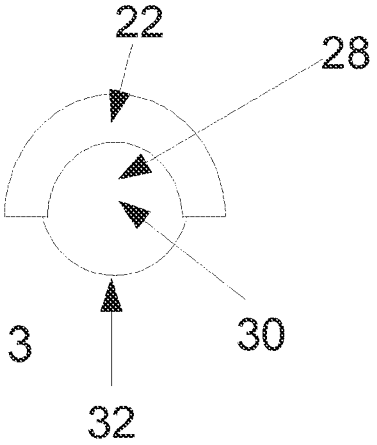
FIG. 3 shows an enlarged bottom view of the nozzle.

As is evident, in particular, in FIGS. 2 and 3, the nozzle 14 exhibits a nozzle body 20 with a wall 22. The wall 22 defines a nozzle duct 28 between a first end 24 and a second end 26.

At the first end 24, a nozzle inlet opening, not represented, has been provided which is connected to the nozzle duct 28. The adhesive material is conveyed into the nozzle duct via the nozzle inlet opening. For this purpose, the nozzle inlet opening has been connected to the gear pump, for instance via a line—such as a hose, for instance—which conveys the adhesive material into the nozzle duct 28.

At the second end 26, a first nozzle discharge opening 30 has been provided which is connected to the nozzle duct 28. As is evident, in particular, in FIG. 2, a second nozzle discharge opening 32, which is likewise connected to the nozzle duct 28, has been introduced into the wall 22 at the second end 26. The adhesive material is applied onto the application surface via the nozzle discharge openings 30, 32. The two nozzle discharge openings 30, 32 are connected to one another and, in the present case, are of approximately semicircular design.

The nozzle body 20 further exhibits a first cylindrical portion 34, a second cylindrical portion 36 and a conical transitional portion 38 connecting the aforementioned two cylindrical portions 34, 36 to one another, a diameter of the first cylindrical portion 34 being larger than a diameter of the second cylindrical portion 36. The two nozzle discharge openings 30, 32 are arranged in the second cylindrical portion 36, and the nozzle inlet opening, not represented, which is connected to the nozzle duct 28, has been provided in the first cylindrical portion 34. The adhesive material enters the nozzle duct 28 via the nozzle inlet opening, and emerges via one or both of the nozzle discharge openings 30, 32.

The nozzle 14 has been mounted in rotatory manner on the positioning system 16, the positioning system 16 exhibiting several linear guides in order to move the nozzle 14 in translation, in particular in order to position the second end 26 in relation to an application surface of the component 12.

For exact positioning of the nozzle 14, in particular of the second end 26, in relation to the application surface, the height-measuring system 18 measures a spacing from the application surface. The height-measuring system 18 may be a laser measuring system or a tactile height-measuring system.

Figure 4:
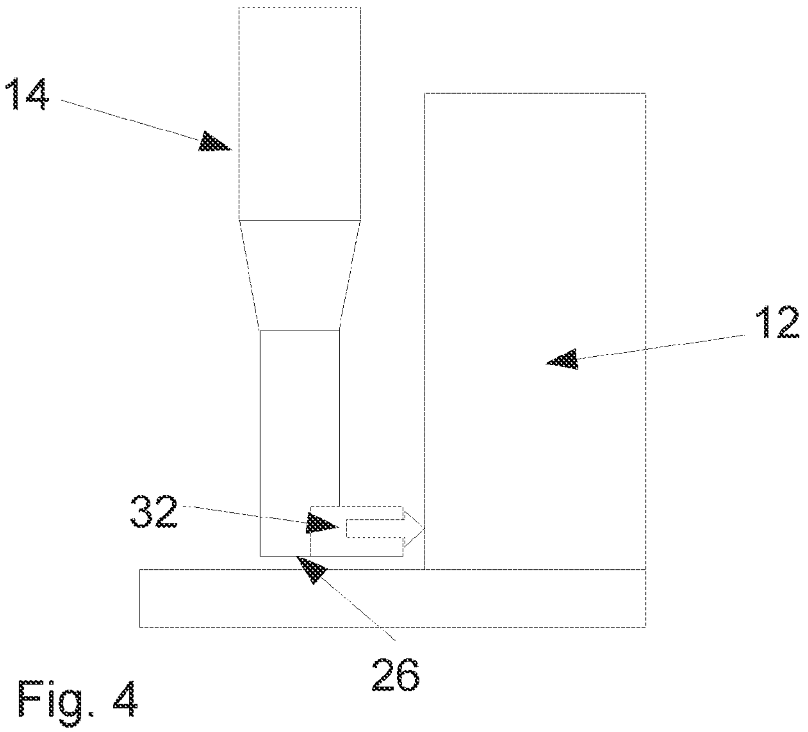
FIG. 4 shows an enlarged representation of the nozzle and of the component, the adhesive material being applied with back pressure via a second nozzle discharge opening.
Figure 5:
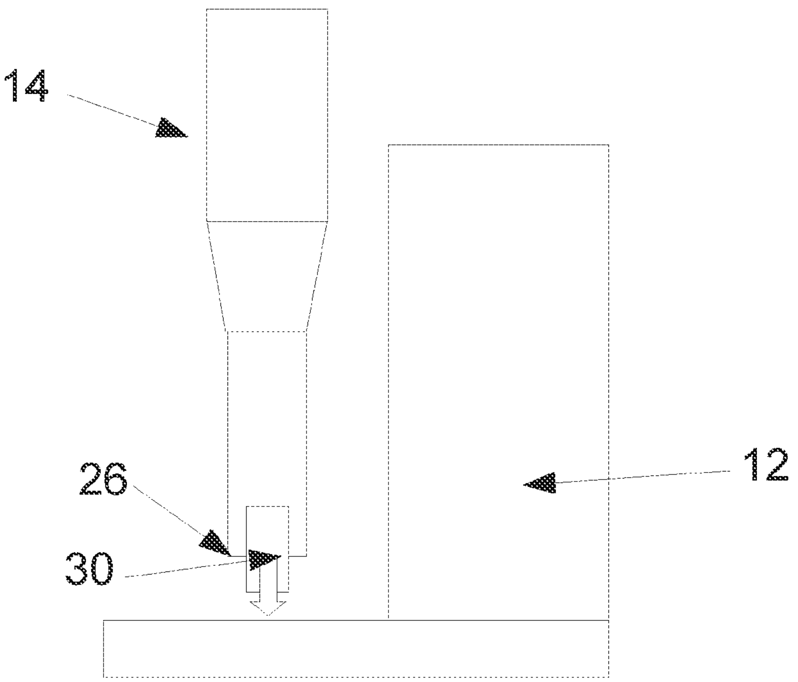
FIG. 5 shows an enlarged representation of the nozzle and of the component, the adhesive material being applied without back pressure via a first nozzle discharge opening.

The application of an adhesive material onto the component 12 by means of the application device 10 and the nozzle 14 will be described in the following. For this purpose, the accessibility to the application surface of the component 12 is firstly ascertained. In this process, it is established whether the application region is easily accessible or whether the application region is difficult to access. In the case of an easily accessible application surface, the adhesive material can be applied from above. In the case of an application surface that is difficult to access—for instance, subspaces and/or interspaces, when the adhesive material is being pushed through under a wire, or the sealing of the application region—the adhesive material has to be applied with back pressure. A spacing between the second end 26 of the nozzle 14 and the application surface is subsequently measured. If difficult accessibility has been ascertained, the first end 24 of the nozzle 14 is then positioned at a spacing from the application surface such that a back pressure arises between the second end 26 and the application surface when the adhesive material is being applied onto the application surface, as a result of which the material emerges from the second nozzle discharge opening 32, as represented in FIG. 4. If easy accessibility has been ascertained, the second end 26 of the nozzle 14 is then positioned at a spacing from the application surface such that a back pressure does not arise between the second end 26 and the application surface when the adhesive material is being applied onto the application surface, as a result of which the material emerges from the first nozzle discharge opening 30, as represented in FIG. 5. Since the nozzle 14 has been mounted in rotatory manner on the positioning system, the adhesive material can be applied in all directions with back pressure.

By reason of its two nozzle discharge openings 30, 32, the nozzle 14 has a high degree of flexibility with regard to the manner of application. Depending upon the accessibility of the application surface, the adhesive material can be applied onto a component 12 with or without back pressure. In addition, by reason of its differing cylindrical portions 34, 36, the nozzle 14 is very well suited for accessibility in confined spaces.

LIST OF REFERENCE SYMBOLS

10 application device
12 component
14 nozzle
16 positioning system
18 height-measuring system
20 nozzle body
22 wall
24 first end
26 second end
28 nozzle duct
30 first nozzle discharge opening
32 second nozzle discharge opening
34 first cylindrical portion
36 second cylindrical portion
38 conical transitional portion

The invention claimed is:

1. A nozzle for applying a bead of material onto a component or a substrate, comprising:

a nozzle body with a wall that defines a nozzle duct between a first end and a second end;

a first nozzle discharge opening formed at the second end and connected to the nozzle duct; and a second nozzle discharge opening connected to the nozzle duct and introduced into the wall at the second end, wherein the nozzle is configured to be positioned in a first position via which a back pressure causes the material to emerge from the second nozzle discharge opening, and in a second position via which a lack of back pressure causes the material to emerge from the first nozzle discharge opening.

2. The nozzle of claim 1, wherein the first nozzle discharge opening and the second nozzle discharge opening are connected to one another.

3. The nozzle of claim 1, wherein at least one of: the first nozzle discharge opening and the second nozzle discharge opening, is semicircular, polygonal or semi-elliptical.

4. The nozzle of claim 1, wherein the nozzle body further includes:

a first cylindrical portion with a first diameter, a second cylindrical portion with a second diameter smaller than the first diameter, and a conical transitional portion connecting the first cylindrical portion to the second cylindrical portion.

5. An application device for applying a bead of material onto a component or a substrate, comprising:

a nozzle comprising:

a body with a wall that defines a nozzle duct between a first end and a second end, a first nozzle discharge opening formed at the second end and connected to the nozzle duct, and a second nozzle discharge opening connected to the nozzle duct and introduced into the wall at the second end;

a positioning system configured to move the nozzle translationally;

a gear pump configured to convey the material into the nozzle duct of the nozzle; and a height-measuring system operable to measure a spacing between the second end of the nozzle and an application surface of the component or the substrate, wherein the application device positions the nozzle in a first position via which a back pressure causes the material to emerge from the second nozzle discharge opening, and in a second position via which a lack of back pressure causes the material to emerge from the first nozzle discharge opening.

6. The application device of claim 5, characterized in that the nozzle is mounted in rotatory manner on the positioning system.

7. The application device of claim 5, wherein the height-measuring system is a laser measuring system or a tactile height-measuring system.

8. A method for applying a bead of material onto a component or a substrate by means of a nozzle comprising: a body with a wall that defines a nozzle duct between a first end and a second end, a first nozzle discharge opening formed at the second end and connected to the nozzle duct, and a second nozzle discharge opening connected to the nozzle duct and introduced into the wall at the second end, the method comprising:

ascertaining an accessibility of an application surface of the component or the substrate;

measuring a spacing between the first end of the nozzle and the application surface;

if a difficult accessibility is ascertained, positioning the second end of the nozzle at a spacing from the application surface such that a back pressure arises when the adhesive material is being applied onto the application surface, so that the material emerges from the second nozzle discharge opening; and if easy accessibility is ascertained, positioning the second end of the nozzle at a spacing from the application surface such that a back pressure does not arise when the adhesive material is being applied onto the application surface, so that the material emerges from the first nozzle discharge opening.

9. The method of claim 8, wherein the method is carried out with an application device comprising: the nozzle, a positioning system configured to position the nozzle translationally, a gear pump configured to convey the material into the nozzle duct of the nozzle, and a height-measuring system operable to measure the spacing between the second end of the nozzle and the application surface of the component or the substrate.

10. A component for a vehicle, with an adhesive material applied by the method of claim 8.

* * * * *